United States Patent [19]

Conrad

[11] 4,260,251
[45] Apr. 7, 1981

[54] IRRADIANCE ANALYZER FOR HIGH POWER LASERS

[75] Inventor: Raymond W. Conrad, Russellville, Ala.

[73] Assignee: The United States of America as represented by the Secretary of the Army, Washington, D.C.

[21] Appl. No.: 80,649

[22] Filed: Oct. 1, 1979

[51] Int. Cl.³ .......................... G01J 1/00; G01J 1/58
[52] U.S. Cl. ........................................ 356/121; 356/43
[58] Field of Search ........................... 356/121, 43–51, 356/250, 213, 216; 250/227, 474, 578; 73/355 R; 350/353–354, 96.24, 96.25, 96.34

[56] References Cited

U.S. PATENT DOCUMENTS

| | | | |
|---|---|---|---|
| 3,222,520 | 12/1965 | McNaney | 250/227 |
| 3,533,657 | 10/1970 | Da Silva | 350/96.24 |
| 3,584,934 | 6/1971 | French | 350/354 |
| 3,739,455 | 6/1973 | Alvarez | 350/211 |
| 3,746,454 | 7/1973 | Pace et al. | 250/578 |
| 3,790,250 | 2/1974 | Mitchell et al. | 350/353 |
| 3,819,442 | 6/1974 | Brushenko | 350/96.24 |
| 4,138,194 | 2/1979 | Beasley et al. | 350/96.34 |

FOREIGN PATENT DOCUMENTS 285738 2/1928 United Kingdom ........................ 250/227
1399953 7/1975 United Kingdom ........................ 350/96.24

OTHER PUBLICATIONS

Quinn, A. A., "A Rapid Inexpensive Method for Determining the Spatial Intensity Distribution of a Laser Beam", Rev. of Scientific Instru., 7-1971, pp. 981-982.
Mourou et al., "Variable Ultrafast Photographic Shutter", Appl. Phys. Lett., 6-1-72, pp. 453-455.
Dreyfus, R. W., "Image Intensifier", IBM Tech. Disc. Bulletin, 2-1974, p. 3102.

*Primary Examiner*—John K. Corbin
*Assistant Examiner*—Wm. H. Punter
*Attorney, Agent, or Firm*—Nathan Edelberg; Robert P. Gibson

[57] ABSTRACT

An irradiance analysis system which includes an array of square rods that are joined together and have a flat entrance end and a polished flat exit end through which visible light is transmitted to a Fresnel lens and focused to a particular area where the image focused is photographed so that when the various frames are developed they can be analyzed in a conventional film densitometer to yield quantative data on the temporal variation of laser beam irradiance distributions.

5 Claims, 2 Drawing Figures

IRRADIANCE ANALYZER FOR HIGH POWER LASERS

DEDICATORY CLAUSE

The invention described herein may be manufactured, used, and licensed by or for the Government for governmental purposes without the payment to me of any royalties thereon.

BACKGROUND OF THE INVENTION

The determination of the time-resolved irradiance profile of a high power infrared laser beam is presently accomplished using high-speed infrared scanning cameras. These cameras employ sophisticated optics to produce a TV-like raster scan on a fast infrared detector; e.g., mercury cadmium telluride. Highly complicated data storage/retrieval devices must be employed to handle the prodigious amounts of data produced. Such systems are complicated, very expensive (in the range of $50,000–$100,000) and require much training and skill to operate. Such systems are portable only in the loosest sense of the word. Therefore, it can be clearly seen that there exists a need for a simple, inexpensive irradiance analyzer system, which is portable and does not require a computer to process the data.

Therefore, it is an object of this invention to provide a simple and inexpensive irradiance analyzer system.

Further object of this invention is to provide an irradiance analyzer system which is truly portable.

Still another object of this invention is to provide an irradiance analyzer system which does not require a computer in order to be able to process the data produced.

Other objects and advantages of this invention will be obvious to those skilled in this art.

SUMMARY OF THE INVENTION

In accordance with this invention, a simple irradiance analyzer system is provided which includes an array of material which converts high power infrared laser beam to visible radiation and a Fresnel lens at an exit end of the array which collects and focuses visible radiation emitted from the end surface of the array onto a film plane of a conventional high speed camera which photographs the image formed at the film plane. The film is then developed and analyzed by conventional densitometric methods to obtain the irradiance profile, from each film frame.

DESCRIPTION OF THE PREFERRED EMBODIMENT

Figure 1:
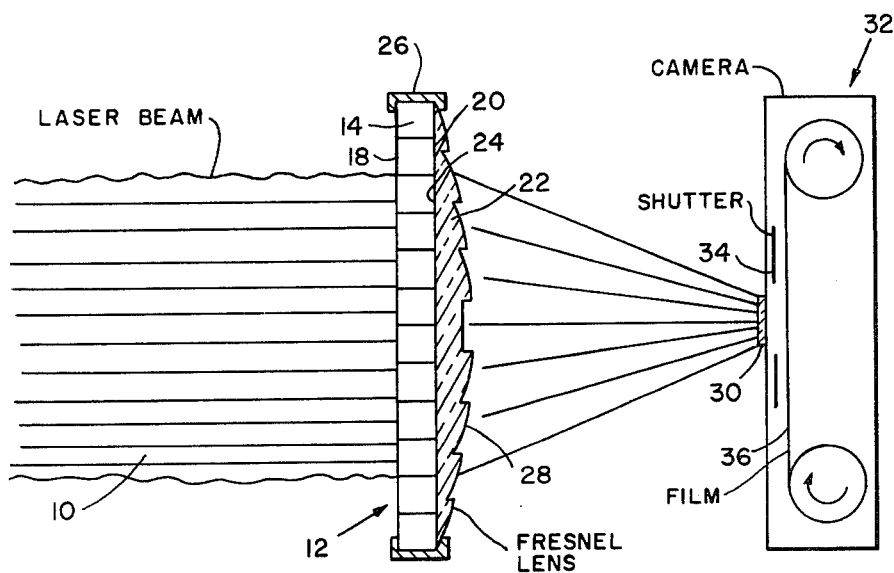
FIG. 1 is a schematic view of an irradiance analyzer system in accordance with this invention.
Figure 2:
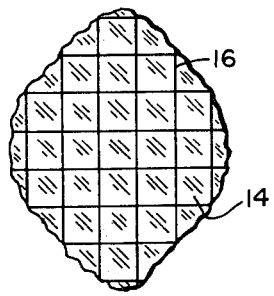
FIG. 2 is a top view partially cutaway illustrating the various rods that are used to form the array.

Referring now to the drawing, a high power infrared laser beam 10 is used to irradiate array 12. Array 12 includes a multiplicity of square rods 14 which are secured together at the sides with any good glue 16 which has a refractive index less than the refractive index of the rods. Rods 14 are made of any of the class of visibly transparent, cleanly ablating materials which are opaque to the laser radiation, and which emit visible radiation when heated by a laser beam, such as polymethyl methacrylate. Each of rods 14 can be about one-half inch square and about 4 to 6 inches long. The rods can also be made in other shapes than square. The dimensions of the rods are not critical, although the spatial resolution is related to the width of the square rods. Also, the length of the rods can be varied in accordance with the length of time they are to be used or exposed to the laser radiation before being worn out due to the heat transmitted thereto. Array 12 has an entrance end face 18 which is substantially flat and an exit end face 20 which is flat and polished to a reasonably smooth surface. Surface 20 can be finished by sanding smooth with medium grit sandpaper and then flame-polishing the end surface. A Fresnel lens 22 has a flat surface 24 which is secured by conventional securing means 26 to array 12. An exit surface 28 of Fresnel lens 22 focuses light transmitted therefrom to a film plane 30 and a camera 32 with shutter 34 and film 36 is utilized for photographing the visible image produced from laser beam 10. Camera 32 is utilized to photograph the image at film plane 30 at any desired speed up to a fundamental limit imposed by the inability of the irradiated array to respond sufficiently quickly to changes in laser intensity. The upper limit for the desired speed is around 100 frames per second.

In operation, high power infrared laser beam 10 is used to irradiate array 12 and when the infrared laser radiation strikes front surface 18 of array 12 end surface 18 becomes heated and emits visible radiation out exit end 20 of array 12. The intensity of the visible radiation exiting face 20 depends on the surface temperature of rods 14 at entrance surface 18, which in turn determines the laser beam intensity at output surface 20. The visible light transmitted from end surface 20 is focused by Fresnel lens 22 to film plane 30 where the image is photographed by camera 32 on film 36. Film 36 is then developed and analyzed on a conventional film densitometer to yield quantative data on the temporal variation of laser beam irradiance distributions.

It is also pointed out that individual rods 14 in array 12 are used to confine the visible radiation to travel parallel to the laser beam; i.e., they function as "light pipes." This makes the interpretation of the photographic image much simpler.

As can be seen, this simple irradiance analyzer system takes advantage of the visible radiation emitted by the materials of which rods 14 of array 12 are made and when array 12 is irradiated by high intensity infrared laser radiation 10, the intensity of the emitted visible radiation at face 20 is simply related to the intensity of laser radiation 10. The temporal response of the emitted visible radiation to changes in the intensity of laser radiation is moderately rapid, although not as fast as the response of an infrared-scanning camera. That is, some temporal resolution is sacrificed, but other factors such as simplicity and cost savings more than compensate. As can be seen, visible radiation emitted at surface 20 of array 12 is collected and focused by Fresnel lens 22 onto film plane 30 and photographed by conventional high speed camera 32. The image thus formed is photographed at the appropriate speed and the film appropriately developed and analyzed by conventional densitometric method to obtain the desired irradiance profile, from each film frame. As can be seen, the developed film is easily analyzed to yield quantative data on temporal variations of laser beam irradiance distributions.

I claim:

1. An irradiance analyzer for high power lasers comprising an array made of a multiplicity of visibly transparent, cleanly ablating material rods which are opaque to laser radiation and which emit visible radiation when heated by said laser radiation and secured together to form an entrance end on one end of the array and an exit end that is polished on the other end of the array, a Fresnel lens having a surface with securing means mounting the surface of the Fresnel lens to the polished surface of the array, and the Fresnel lens having another surface for focusing light to a film plane and a camera for photographing an image at the film plane.

2. An irradiance analyzer as set forth in claim 1, wherein said array is made of a multiplicity of rods that are about one-half inch square and about 4 to 6 inches long.

3. An irradiance analyzer as set forth in claim 2, wherein said visibly transparent, cleanly ablating material is polymethyl methacrylate.

4. An irradiance analyzer as set forth in claim 3, wherein said rods are secured together with a glue with a refractive index lower than the rod material.

5. An irradiance analyzer as set forth in claim 4, wherein said array is irradiated with a high power infrared laser beam to cause light to be produced at said polished surface and light to be focused by said Fresnel lens to produce an image at said film plane for being photographed by said camera.

* * * * *